US012559111B2

(12) United States Patent
Youssef et al.

(10) Patent No.: US 12,559,111 B2
(45) Date of Patent: Feb. 24, 2026

(54) METHOD AND ELECTRONIC CONTROL SYSTEM FOR ASCERTAINING A DISTANCE TRAVELLED BY A VEHICLE

(71) Applicant: Continental Automotive Technologies GmbH, Hannover (DE)

(72) Inventors: Mohanad Youssef, Frankfurt am Main (DE); Kai Bretzigheimer, Mainz (DE)

(73) Assignee: AUMOVIO Germany GmbH, Frankfurt am Main (DE)

( * ) Notice: Subject to any disclaimer, the term of this patent is extended or adjusted under 35 U.S.C. 154(b) by 123 days.

(21) Appl. No.: 18/269,016

(22) PCT Filed: Nov. 16, 2021

(86) PCT No.: PCT/DE2021/200188
§ 371 (c)(1),
(2) Date: Jun. 22, 2023

(87) PCT Pub. No.: WO2022/135636
PCT Pub. Date: Jun. 30, 2022

(65) Prior Publication Data
US 2024/0043018 A1    Feb. 8, 2024

(30) Foreign Application Priority Data

Dec. 22, 2020    (DE) ..................... 10 2020 216 465.7

(51) Int. Cl.
B60W 40/12        (2012.01)
B60W 60/00        (2020.01)
(Continued)

(52) U.S. Cl.
CPC ............ B60W 40/12 (2013.01); B60W 60/00 (2020.02); G01S 19/393 (2019.08);
(Continued)

(58) Field of Classification Search
None
See application file for complete search history.

(56) References Cited

U.S. PATENT DOCUMENTS

| | | | | |
|---|---|---|---|---|
| 9,714,031 B2* | 7/2017 | Lavoie | ................ | B62D 15/027 |
| 2022/0024463 A1* | 1/2022 | Kroupa | ................ | B62D 15/027 |
| 2024/0043016 A1* | 2/2024 | Gruenwedel | ......... | G01S 13/931 |

FOREIGN PATENT DOCUMENTS

| | | |
|---|---|---|
| DE | 102016103637 A1 | 9/2016 |
| DE | 102017002637 A1 * | 10/2017 |

(Continued)

OTHER PUBLICATIONS

Christian Lundquist et al. "Tire Radii Estimation Using a Marginalized Particle Filter", IEEE Transactions on Intelligent Transportation Systems, IEEE, Piscataway, NJ, USA, Bd. 15, Nr. 2, Apr. 2014, pp. 663-672, XP011544628, ISSN: 1 524-9050, DOI: 10.1 1 09/T1TS.2013.2284930.

(Continued)

*Primary Examiner* — Peter D Nolan
*Assistant Examiner* — Jacob Kent Besteman-Street

(57)        ABSTRACT

A method and a corresponding electronic control system for ascertaining a distance traveled by a vehicle predicts with a Kalman filter a distance traveled by the vehicle using a change in angle of rotation of at least one right wheel and/or at least one left wheel of the vehicle for a specific period of time while the vehicle is traveling and an ascertained radius of the right wheel and/or ascertained circumference of the right wheel of the vehicle and/or an ascertained radius of the left wheel and/or ascertained circumference of the left wheel of the vehicle; and corrects the predicted traveled distance by a Kalman filter correction to ascertain the distance traveled by the vehicle using the predicted traveled distance and a local distance between at least two absolute positions (Continued)

100

Carry out a prediction step of a Kalman filter so as to predict a predicted distance traveled by the vehicle using a change in angle of rotation of at least one right wheel and/or at least one left wheel of the vehicle for a specific period of time while the vehicle is traveling and an ascertained radius of the right wheel of the vehicle and/or an ascertained radius of the left wheel of the vehicle; 102

Carry out a correction step of the Kalman filter so as to correct the predicted traveled distance so as to ascertain the distance traveled by the vehicle using the predicted traveled distance and a local distance between at least two absolute positions of the vehicle that are recorded within the specific period of time with a time interval while the vehicle is traveling 104 of the vehicle recorded within the specific period of time with a time interval while the vehicle is traveling.

16 Claims, 2 Drawing Sheets

(51) Int. Cl.
 *G01S 19/39* (2010.01)
 *B60W 50/00* (2006.01)
(52) U.S. Cl.
 CPC . *B60W 2050/0031* (2013.01); *B60W 2422/70* (2013.01); *B60W 2530/18* (2013.01)

(56) References Cited

FOREIGN PATENT DOCUMENTS

| | | | |
|---|---|---|---|
| DE | 102017011029 | A1 | 7/2018 |
| DE | 102018222152 | A1 | 6/2020 |

OTHER PUBLICATIONS

Office Action dated Jul. 23, 2021 from corresponding German patent application No. 10 2020 216 465.7.
International Search Report and Written Opinion dated Feb. 8, 2022 from corresponding International patent application No. PCT/DE2021/200188.
Office Action dated Mar. 17, 2025 from corresponding German patent application No. 10 2020 216 465.7.

* cited by examiner

100

Carry out a prediction step of a Kalman filter so as to predict a predicted distance traveled by the vehicle usinga change in angle of rotation of at least one right wheel and/or at least one left wheel of the vehicle for a specific period of time while the vehicle is traveling and an ascertained radius ofthe right wheel of the vehicle and/or an ascertained radius of the left wheel of the vehicle; _102_

Carry out a correction step of the Kalman filter so as to correct the predicted traveled distance so as to ascertain the distance traveled by the vehicle using the predicted traveled distance and a local distance between at least two absolute positions of the vehicle that are recorded within the specific period of time with a time interval while the vehicle is traveling    _104_

FIG. 1

METHOD AND ELECTRONIC CONTROL SYSTEM FOR ASCERTAINING A DISTANCE TRAVELLED BY A VEHICLE

TECHNICAL FIELD

The present invention relates to a method for ascertaining a distance traveled by a vehicle and to a corresponding vehicle system.

TECHNICAL BACKGROUND

By way of example, for automated vehicle systems, it is necessary to determine the current position of the vehicle in question in order to automatically navigate the vehicle on the planned trajectory to the final parking position. Usually, to determine the speed of the vehicle, the speed recorded by way of a GNSS system and the speed recorded by way of wheel speed sensors are fused, this being known as dead reckoning. To determine the speed using wheel speed sensors, for example, pulses are recorded using an encoder wheel. The covered distance or the speed of the vehicle may then be determined using the recorded impulses if the wheel circumference is known.

However, it should be taken into consideration that the tire circumference changes, for example, depending on the tire pressure and when changing between summer and winter tires. Changing between summer and winter tires may result in a change of 3%, for example, which results in an error that is already considered to be too high compared to the requirements of modern automated parking systems in terms of position detection.

DE 10 2016 103 637 A1 relates to a vehicle parking assistance system and to a parking method in which a speed determined by way of GPS and a wheel speed are used to estimate a tire radius. This approach is disadvantageous in that a GPS speed signal is noisy at low speeds, and is only more suitable for an evaluation at higher speeds.

Current systems, which determine the wheel circumference using a speed recorded by way of a GNSS system, require the vehicle to be traveling faster than 80 km/h in order to achieve sufficient determination accuracy, which is then also used for lower speeds. This is already disadvantageous because, after a tire change, an automated driving maneuver is usually intended to be carried out before the vehicle drives at the required speed on a corresponding road. If the tire circumference is thus determined on the basis of a speed recorded by way of a GNSS system and by way of the wheel speeds, the accuracy is not sufficient for current systems. In addition, however, the tire radius is larger at higher speeds than at low speeds due to temperature effects. At low speeds, the tire radius, and thus the tire circumference, is smaller than at higher speeds, as a result of which the accuracy in terms of ascertaining the distance covered or the speed of the vehicle decreases for low speeds and, in particular, the accuracy requirements of modern systems in terms of carrying out automated driving maneuvers cannot be met for low speeds.

The object of the invention may be considered that of enabling improved accuracy in terms of ascertaining a distance traveled or position of a vehicle, in particular for low vehicle speeds.

The object is achieved by the subjects of the independent claims. Embodiments building thereon are described in the dependent claims.

According to a first aspect of the disclosure, what is described is a method for ascertaining a distance traveled by a vehicle, having the following steps:

carrying out a prediction step of a Kalman filter so as to predict a predicted distance traveled by the vehicle using a change in angle of rotation of at least one right wheel and/or at least one left wheel of the vehicle for a specific period of time while the vehicle is traveling and an ascertained radius of the right wheel and/or ascertained circumference of the right wheel of the vehicle and/or an ascertained radius of the left wheel and/or ascertained circumference of the left wheel of the vehicle;

carrying out a correction step of the Kalman filter so as to correct the predicted traveled distance so as to ascertain the distance traveled by the vehicle using the predicted traveled distance and a local distance between at least two absolute positions of the vehicle that are recorded within the specific period of time with a time interval while the vehicle is traveling.

Absolute positions that are ascertained in particular using a GNSS (global navigation satellite system) should be understood to mean in particular positions in coordinates of a global coordinate system, such as for example WGS84. In contrast thereto, odometry coordinates are often represented in a local vehicle coordinate system.

In principle, different radii of a wheel may be taken as a basis within the scope of the disclosure. In the present case, the respective ascertained radii of the right and left wheel should be understood to mean in particular the respective dynamic rolling radii. The dynamic rolling radius is calculated in particular notionally from the rolling circumference of a wheel, wherein the dynamic rolling radius describes the distance between the center of the wheel and the road surface, for example in accordance with DIN, when the vehicle is traveling at 60 km/h.

The vehicle may be a motor vehicle, in particular a passenger motor vehicle, a heavy goods vehicle, a motorcycle, an electric motor vehicle or a hybrid motor vehicle, a watercraft or an aircraft.

The described method makes it possible to ascertain the distance traveled and/or position of a vehicle with improved accuracy, in particular for or at comparatively low speeds.

The underlying idea is to determine the tire circumference at comparatively low speeds, in particular between 0-80 km/h or 20-80 km/h, while complying with the accuracy requirements of modern systems. Instead of using the speed recorded by way of GNSS, as is usually the case, the absolute positions recorded by way of GNSS are used. A speed signal recorded by way of GNSS is comparatively difficult to evaluate, in particular at comparatively low speeds, and does not offer sufficient accuracy in terms of determining the wheel circumference, which, however, is necessary for example for automated parking systems or parking assistants. It cannot be assumed here that the vehicle was already traveling at a speed of more than 80 km/h, which would often enable the circumference to be determined with sufficient accuracy on the basis of the speed recorded by way of GNSS. The more accurate values of the wheel circumferences make it possible to ascertain the position of the vehicle likewise with greater accuracy, for example when using dead reckoning.

The starting position recorded by way of GNSS and the direction of travel are often different compared to odometry, since the direction of travel, when determined by way of GNSS, is able to be determined only when multiple measurements in motion are present. According to one development, a coordinate transformation is therefore performed prior to a fusion by the Kalman filter of the data from odometry and the absolute coordinates.

Based on the distance between the ascertained absolute positions, according to one embodiment, the distance covered by the vehicle is determined, this distance usually being independent of the direction of travel. By way of example, the distance covered by the vehicle for a period of time under consideration, in which two positions are recorded by way of GNSS, accordingly corresponds to the distance between the two absolute positions recorded in chronological succession. The covered distance is expediently determined in this case by accumulating the distance between the at least two positions ascertained by way of GNSS. The covered distance may accordingly be determined by accumulating the distance between a larger number of positions ascertained by way of GNSS.

According to at least one embodiment, the ascertained radius and/or the ascertained circumference of the right wheel of the vehicle is ascertained based on a stored radius and/or stored circumference of the right wheel of the vehicle and an ascertained radius error and/or ascertained circumference error of the right wheel and/or the ascertained radius and/or the ascertained circumference of the left wheel of the vehicle is ascertained based on a stored radius and/or stored circumference of the left wheel of the vehicle and an ascertained radius error and/or ascertained circumference error of the left wheel.

The stored radii for the right and left wheel, like the ascertained radii, relate in particular to the dynamic rolling radii.

According to at least one embodiment, the ascertained radius error and/or the ascertained circumference error of the right wheel of the vehicle and/or the stored radius of the right wheel and/or the stored circumference of the right wheel of the vehicle and/or the ascertained radius error of the left wheel and/or the ascertained circumference error of the left wheel of the vehicle and/or the stored radius of the left wheel and/or the stored circumference of the left wheel of the vehicle are corrected for use in a subsequent iteration of the Kalman filter based on a residual ascertained during the correction step of the Kalman filter and/or a Kalman gain. The radius and/or circumference of the wheels of a vehicle may thus be ascertained with improved accuracy, as a result of which the covered distance and the position detection or speed detection may be determined more accurately. In a conventional passenger motor vehicle, the respective circumferences of at least one of the four wheels may be ascertained accordingly.

According to at least one embodiment, the prediction step is based on a non-linear motion model and/or the correction step is based on a linear measurement model.

According to at least one embodiment, the state vector $\hat{x}$ for describing a state of the vehicle in this case has the following form:

$$\hat{x} = [x \ y \ \psi \ \delta_R \ \delta_L \ \Delta S]^T$$

where:

x vehicle position in odometry coordinates with respect to an X-axis of an underlying coordinate system;

y vehicle position in odometry coordinates with respect to the Y-axis;

$\psi$ yaw angle (yaw) of the vehicle;

$\delta_R$ radius error between the current ascertained radius of the right in particular rear wheel and the stored radius of the right in particular rear wheel;

$\delta_L$ radius error between the current ascertained radius of the left in particular rear wheel and the stored radius of the left in particular rear wheel; and $\Delta S$ traveled distance recorded using GNSS According to at least one embodiment, the non-linear motion model f is in the following form:

$$f = \begin{bmatrix} x_{k|k-1} \\ y_{k|k-1} \\ \psi_{k|k-1} \\ \delta_{R,k|k-1} \\ \delta_{L,k|k-1} \\ \Delta S_{k|k-1} \end{bmatrix} = \begin{bmatrix} x_{k-1|k-1} + \Delta s_k \cos\left(\psi_{k-1|k-1} + \dfrac{\Delta\psi_k}{2}\right) \\ y_{k-1|k-1} + \Delta s_k \sin\left(\psi_{k-1|k-1} + \dfrac{\Delta\psi_k}{2}\right) \\ \psi_{k-1|k-1} + \Delta\psi_k \\ \delta_{R,k-1|k-1} \\ \delta_{L,k-1|k-1} \\ \Delta S_{k-1|k-1} + \Delta s_k \end{bmatrix}$$

where:

$$\Delta s_k = \frac{1}{2}(\Delta\theta_{R,k}(r_{R,s} + \delta_{R,k}) + \Delta\theta_{L,k}(r_{L,s} + \delta_{L,k}))$$

$$\Delta\psi_k = \frac{1}{L_{TW}}(\Delta\theta_{R,k}(r_{R,s} + \delta_{R,k}) - \Delta\theta_{L,k}(r_{L,s} + \delta_{L,k}))$$

$$\delta_R \triangleq r_{R,a} - r_{R,s}$$

$$\delta_L \triangleq r_{L,a} - r_{L,s}$$

$$r_{R,e} = r_{R,s} + \delta_R$$

$$r_{L,e} = r_{L,s} + \delta_L$$

$\Delta s$ traveled distance recorded using odometry;

$L_{TW}$ distance between right and left wheel, in particular rear wheel;

$r_{R,a}$ (unknown) real radius of the right in particular rear wheel;

$r_{L,a}$ (unknown) real radius of the left in particular rear wheel;

$r_{R,s}$ stored radius of the right in particular rear wheel;

$r_{L,s}$ stored radius of the left in particular rear wheel;

$r_{R,e}$ ascertained radius of the right in particular rear wheel;

$r_{L,e}$ ascertained radius of the left in particular rear wheel;

$\Delta\theta_R$ change in angle of rotation of the right in particular rear wheel;

$\Delta\theta_L$ change in angle of rotation of the left in particular rear wheel; and $\Delta\psi$ change in yaw angle of the vehicle.

The first three equations of the non-linear motion model f are odometry equations that add the change in orientation of the vehicle to the previous orientation.

Lines 1 and 2 of the motion model f represent the movement in the X and Y direction of the coordinate system in question, taking into account the change in orientation and the distance covered.

According to one embodiment, the change in orientation is ascertained by comparing the rolling distance of the right and left wheels of the rear axle. During cornering, the rolling distance of the inner wheel of the vehicle with respect to the corner is less than that of the outer wheel. On a leftward corner, the rolling distance of the left wheel is thus less than the rolling distance of the right wheel.

Lines 4 and 5 of the motion model f represent the deviations of the respective wheel circumference of a left and right rear wheel of the vehicle compared to the stored wheel circumferences. The deviations and the stored wheel circumferences make it possible to ascertain the current actual wheel circumferences.

The last line, line 6, of the motion model f represents the change in the traveled distance, in particular on the basis of the signals from the wheel speed sensors. ΔS in this case describes the change in the traveled distance, ascertained in particular using a GNSS.

Changes in angle of rotation of a wheel when rolling and the speed of a wheel may be recorded using a wheel speed sensor, which may for example output signals triggered by an encoder. An output signal from an encoder may for example describe a square-wave signal or a sinusoidal signal. It is thus possible to detect a change in angle of a wheel by counting the number of pulses in relation to the total number of pulses during one revolution of the wheel. The accuracy of the detection of the change in angle depends here on the resolution of the encoder.

In principle, to determine a circumference of a wheel C, for example, the covered distance S may be crossed with, in particular multiplied by, a ratio of the number of detected pulses n in a wheel speed sensor signal and the total number of pulses during one revolution of the wheel $N_{tics}$. The relationship between wheel circumference C, covered distance S and the change in angle of rotation from the ratio of the number of detected pulses n in a wheel speed sensor signal and the total number of pulses during one revolution of the wheel $N_{tics}$ may thus be represented as follows:

$$C = \frac{S \cdot N_{tics}}{n}$$

The change in angle of rotation of a wheel may then be ascertained as follows:

$$\Delta\theta = 2\pi \cdot \left(\frac{n}{N_{tics}}\right)$$

The radius r, in particular the dynamic rolling radius, of a wheel may thereby be ascertained:

$$C = 2\pi\frac{S}{\Delta\theta} = 2\pi \cdot r$$

$$S = \Delta\theta \cdot r$$

The distances between the recorded GNSS positions may be ascertained as already described and then fused with the path recorded by way of wheel speed sensors.

According to at least one embodiment, a covered distance is ascertained on the basis of a radius of the right wheel using the detected local distance and the changes in angle of rotation of the right wheel of the vehicle and/or a radius of the left wheel is ascertained using the detected local distance and the changes in angle of rotation of the left wheel of the vehicle.

According to at least one embodiment, the circumference of the left wheel of the vehicle is ascertained using the recorded covered distance and the change in angle of rotation of the left wheel of the vehicle during rolling of the left wheel of the vehicle over the covered distance and/or the circumference of the right wheel of the vehicle is ascertained using the recorded covered distance and the change in angle of rotation of the right wheel of the vehicle during rolling of the right wheel of the vehicle over the covered distance.

According to at least one embodiment, a non-linear Kalman filter is used for the calculations, since the prediction model that is used is non-linear. In particular, an extended Kalman filter (EKF) or unscented Kalman filter (UKF) or a particle filter are used. EKF and UKF are particularly advantageous in terms of complexity and the demands on computing resources and memory requirements.

EKF

Prediction:

$$\hat{x}_{k|k-1} = f(\hat{x}_{k-1|k-1}, u_k, w_k, \lambda_R) = f(\hat{x}_{k-1|k-1}, u_k, 0, 0)$$

$$P_{k|k-1} = A_k P_{k-1|k-1} A_k^T + B_k U_k B_k^T + Q_k$$

w Temporally uncorrelated process or system noise
Q Covariance of process or system noise
u Deterministic disturbance or input disturbance
U Covariance of the deterministic disturbance or input disturbance
λ Average input white noise $$u_k = [\Delta\theta_{R,k} \quad \Delta\theta_{L,k}]^T$$

$$U_k = \begin{bmatrix} \sigma^2_{\Delta\theta_R} & 0 \\ 0 & \sigma^2_{\Delta\theta_L} \end{bmatrix}$$

The prediction step performed by the EKF requires calculating the Jacobian matrix A of the state vector $\hat{x}_{k-1|k-1}$ and the Jacobian matrix B of the input disturbance $u_k$, which comprises the first partial derivatives of the arguments.

Input values for the correction of the Jacobian matrices are in particular the changes in angle of rotation of the rear right $\Delta\theta_R$ and rear left wheel $\Delta\theta_L$, the change in yaw angle $\Delta\psi$, for example from a differential model, and the recorded change in odometry $\Delta s$.

Jacobian Matrix of the State Vector:

$$A_{[i,j]} = \frac{\partial f_{[i]}}{\partial \hat{x}_{[j]}}(\hat{x}_{k-1|k-1}, u_k, 0, 0)$$

$$A_k = \begin{bmatrix} \frac{\partial f_x}{\partial x_{k-1}} & \frac{\partial f_x}{\partial y_{k-1}} & \frac{\partial f_x}{\partial \psi_{k-1}} & \frac{\partial f_x}{\partial \delta_{R,k-1}} & \frac{\partial f_x}{\partial \delta_{L,k-1}} & \frac{\partial f_x}{\partial \Delta S_{k-1}} \\ \frac{\partial f_y}{\partial x_{k-1}} & \frac{\partial f_y}{\partial y_{k-1}} & \frac{\partial f_y}{\partial \psi_{k-1}} & \frac{\partial f_y}{\partial \delta_{k-1}} & \frac{\partial f_y}{\partial \delta_{L,k-1}} & \frac{\partial f_y}{\partial \Delta S_{k-1}} \\ \frac{\partial f_\psi}{\partial x_{k-1}} & \frac{\partial f_\psi}{\partial y_{k-1}} & \frac{\partial f_\psi}{\partial \psi_{k-1}} & \frac{\partial f_\psi}{\partial \delta_{k-1}} & \frac{\partial f_\psi}{\partial \delta_{L,k-1}} & \frac{\partial f_\psi}{\partial \Delta S_{k-1}} \\ \frac{\partial f_{\delta_R}}{\partial x_{k-1}} & \frac{\partial f_{\delta_R}}{\partial y_{k-1}} & \frac{\partial f_{\delta_R}}{\partial \psi_{k-1}} & \frac{\partial f_{\delta_R}}{\partial \delta_{k-1}} & \frac{\partial f_{\delta_R}}{\partial \delta_{L,k-1}} & \frac{\partial f_{\delta_R}}{\partial \Delta S_{k-1}} \\ \frac{\partial f_{\delta_L}}{\partial x_{k-1}} & \frac{\partial f_{\delta_L}}{\partial y_{k-1}} & \frac{\partial f_{\delta_L}}{\partial \psi_{k-1}} & \frac{\partial f_{\delta_L}}{\partial \delta_{k-1}} & \frac{\partial f_{\delta_L}}{\partial \delta_{L,k-1}} & \frac{\partial f_{\delta_L}}{\partial \Delta S_{k-1}} \\ \frac{\partial f_{\Delta S}}{\partial x_{k-1}} & \frac{\partial f_{\Delta S}}{\partial y_{k-1}} & \frac{\partial f_{\Delta S}}{\partial \psi_{k-1}} & \frac{\partial f_{\Delta S}}{\partial \delta_{k-1}} & \frac{\partial f_{\Delta S}}{\partial \delta_{L,k-1}} & \frac{\partial f_{\Delta S}}{\partial \Delta S_{k-1}} \end{bmatrix}$$

where:

$$\frac{\partial f_x}{\partial x_{k-1}} = \frac{\partial f_y}{\partial y_{k-1}} = \frac{\partial f_\psi}{\partial \psi_{k-1}} = \frac{\partial f_{\delta_R}}{\partial \delta_{R,k-1}} = \frac{\partial f_{\delta_L}}{\partial \delta_{L,k-1}} = \frac{\partial f_{\Delta S}}{\partial \Delta S_{k-1}} = 1$$

$$\frac{\partial f_x}{\partial \psi_{k-1}} = -\frac{\Delta s_k}{2}\sin\left(\psi_{k-1} + \frac{\Delta\psi_k}{2}\right)$$

$$\frac{\partial f_y}{\partial \psi_{k-1}} = \frac{\Delta s_k}{2}\cos\left(\psi_{k-1} + \frac{\Delta\psi_k}{2}\right)$$

$$\frac{\partial f_x}{\partial \delta_{R,k-1}} = \frac{\Delta\theta_{R,k}}{2}\cos\left(\psi_{k-1} + \frac{\Delta\psi_k}{2}\right) - \frac{\Delta s_k \Delta\theta_{R,k}}{2L_{TW}}\sin\left(\psi_{k-1} + \frac{\Delta\psi_k}{2}\right)$$

-continued $$\frac{\partial f_y}{\partial \delta_{R,k-1}} = \frac{\Delta \theta_{R,k}}{2} \sin\left(\psi_{k-1} + \frac{\Delta \psi_k}{2}\right) + \frac{\Delta s_k \Delta \theta_{R,k}}{2L_{TW}} \cos\left(\psi_{k-1} + \frac{\Delta \psi_k}{2}\right)$$

$$\frac{\partial f_\psi}{\partial \delta_{R,k-1}} = \frac{\Delta \theta_{R,k}}{L_{TW}}$$

$$\frac{\partial f_{\Delta S}}{\partial \delta_{R,k-1}} = \frac{\Delta \theta_{R,k}}{2}$$

$$\frac{\partial f_x}{\partial \delta_{L,k-1}} = \frac{\Delta \theta_{L,k}}{2} \cos\left(\psi_{k-1} + \frac{\Delta \psi_k}{2}\right) + \frac{\Delta s_k \Delta \theta_{L,k}}{2L_{TW}} \sin\left(\psi_{k-1} + \frac{\Delta \psi_k}{2}\right)$$

$$\frac{\partial f_y}{\partial \delta_{L,k-1}} = \frac{\Delta \theta_{L,k}}{2} \sin\left(\psi_{k-1} + \frac{\Delta \psi_k}{2}\right) - \frac{\Delta s_k \Delta \theta_{L,k}}{2L_{TW}} \cos\left(\psi_{k-1} + \frac{\Delta \psi_k}{2}\right)$$

$$\frac{\partial f_\psi}{\partial \delta_{L,k-1}} = -\frac{\Delta \theta_{L,k}}{L_{TW}}$$

$$\frac{\partial f_{\Delta S}}{\partial \delta_{L,k-1}} = \frac{\Delta \theta_{L,k}}{2}$$

$$\frac{\partial f_y}{\partial x_{k-1}} = \frac{\partial f_\psi}{\partial x_{k-1}} = \frac{\partial f_{\delta_R}}{\partial x_{k-1}} = \frac{\partial f_{\delta_L}}{\partial x_{k-1}} = \frac{\partial f_{\Delta S}}{\partial x_{k-1}} = \frac{\partial f_x}{\partial y_{k-1}}$$

$$\frac{\partial f_\psi}{\partial y_{k-1}} = \frac{\partial f_{\delta_R}}{\partial y_{k-1}} = \frac{\partial f_{\delta_L}}{\partial y_{k-1}} = \frac{\partial f_{\Delta S}}{\partial y_{k-1}}$$

$$= \frac{\partial f_{\delta_R}}{\partial \psi_{k-1}}$$

$$= \frac{\partial f_{\delta_L}}{\partial \psi_{k-1}} = \frac{\partial f_{\Delta S}}{\partial \psi_{k-1}} = \frac{\partial f_{\delta_L}}{\partial \delta_{R,k-1}} = \frac{\partial f_{\delta_R}}{\partial \delta_{L,k-1}} = \frac{\partial f_x}{\partial \Delta S_{k-1}}$$

$$\frac{\partial f_y}{\partial \Delta S_{k-1}} = \frac{\partial f_\psi}{\partial \Delta S_{k-1}} = \frac{\partial f_{\delta_R}}{\partial \Delta S_{k-1}} = \frac{\partial f_{\delta_L}}{\partial \Delta S_{k-1}}$$

$$= 0$$

Jacobian Matrix of the Input Disturbance:

$$B_{[i,j]} = \frac{\partial f_{[i]}}{\partial u_{[j]}}\left(\hat{x}_{k-1|k-1}, u_k, 0, 0\right)$$

$$B_k = \begin{bmatrix} \dfrac{\partial f_x}{\partial \Delta \theta_{R,k}} & \dfrac{\partial f_x}{\partial \Delta \theta_{L,k}} \\[2ex] \dfrac{\partial f_y}{\partial \Delta \theta_{R,k}} & \dfrac{\partial f_y}{\partial \Delta \theta_{L,k}} \\[2ex] \dfrac{\partial f_\psi}{\partial \Delta \theta_{R,k}} & \dfrac{\partial f_\psi}{\partial \Delta \theta_{L,k}} \\[2ex] \dfrac{\partial f_{\delta_R}}{\partial \Delta \theta_{R,k}} & \dfrac{\partial f_{\delta_R}}{\partial \Delta \theta_{L,k}} \\[2ex] \dfrac{\partial f_{\delta_L}}{\partial \Delta \theta_{R,k}} & \dfrac{\partial f_{\delta_L}}{\partial \Delta \theta_{L,k}} \\[2ex] \dfrac{\partial f_{\Delta S}}{\partial \Delta \theta_{R,k}} & \dfrac{\partial f_{\Delta S}}{\partial \Delta \theta_{L,k}} \end{bmatrix}$$

where:

$$\frac{\partial f_x}{\partial \Delta \theta_{R,k}} =$$

$$\frac{(r_{R,s} + \delta_{R,k-1})}{2} \cos\left(\psi_{k-1} + \frac{\Delta \psi_k}{2}\right) - \frac{(r_{R,s} + \delta_{R,k-1}) \Delta s_k}{2L_{TW}} \sin\left(\psi_{k-1} + \frac{\Delta \psi_k}{2}\right)$$

$$\frac{\partial f_x}{\partial \Delta \theta_{L,k}} = \frac{(r_{L,s} + \delta_{L,k-1})}{2} \cos\left(\psi_{k-1} + \frac{\Delta \psi_k}{2}\right) +$$

$$\frac{(r_{L,s} + \delta_{L,k-1}) \Delta s_k}{2L_{TW}} \sin\left(\psi_{k-1} + \frac{\Delta \psi_k}{2}\right)$$

$$\frac{\partial f_y}{\partial \Delta \theta_{R,k}} = \frac{(r_{R,s} + \delta_{R,k-1})}{2} \sin\left(\psi_{k-1} + \frac{\Delta \psi_k}{2}\right) +$$

-continued $$\frac{(r_{R,s} + \delta_{R,k-1}) \Delta s_k}{2L_{TW}} \cos\left(\psi_{k-1} + \frac{\Delta \psi_k}{2}\right)$$

$$\frac{\partial f_y}{\partial \Delta \theta_{L,k}} = \frac{(r_{L,s} + \delta_{L,k-1})}{2} \sin\left(\psi_{k-1} + \frac{\Delta \psi_k}{2}\right) -$$

$$\frac{(r_{L,s} + \delta_{L,k-1}) \Delta s_k}{2L_{TW}} \cos\left(\psi_{k-1} + \frac{\Delta \psi_k}{2}\right)$$

$$\frac{\partial f_\psi}{\partial \Delta \theta_{R,k}} = \frac{(r_{R,s} + \delta_{R,k-1})}{L_{TW}}$$

$$\frac{\partial f_\psi}{\partial \Delta \theta_{L,k}} = -\frac{(r_{L,s} + \delta_{L,k-1})}{L_{TW}}$$

$$\frac{\partial f_{\Delta S}}{\partial \Delta \theta_{R,k}} = \frac{(r_{R,s} + \delta_{R,k-1})}{2}$$

$$\frac{\partial f_{\Delta S}}{\partial \Delta \theta_{L,k}} = \frac{(r_{L,s} + \delta_{L,k-1})}{2}$$

$$\frac{\partial f_{\delta_R}}{\partial \Delta \theta_{R,k}} = \frac{\partial f_{\delta_R}}{\partial \Delta \theta_{L,k}} = \frac{\partial f_{\delta_L}}{\partial \Delta \theta_{R,k}} = \frac{\partial f_{\delta_L}}{\partial \Delta \theta_{L,k}} = 0$$

Correction:

This is a linear correction step since the measurement model is linear. Thus, advantageously, only the prediction step is non-linear.

Measurement Model:

$$z_k = \left[\Delta S_{k|k}\right]^T$$

$$H = [0 \ \ 0 \ \ 0 \ \ 0 \ \ 0 \ \ 1]$$

$$\hat{y}_k = H\hat{x}_{k|k-1} = [0 \ \ 0 \ \ 0 \ \ 0 \ \ 0 \ \ 1] \begin{bmatrix} x_{k|k-1} \\ y_{k|k-1} \\ \psi_{k|k-1} \\ \delta_{R,k|k-1} \\ \delta_{L,k|k-1} \\ \Delta S_{k|k-1} \end{bmatrix}$$

Kalman Gain:

$$R = \sigma_{GPS}^2$$

$$K_k = \frac{P_{k|k-1} H^T}{H P_{k|k-1} H^T + R}$$

Innovation (Residual):

$$v_k = z_k - H\hat{x}_{k|k-1} = z_k - \hat{y}_k$$

Correction of the State Vector and the Covariance:

$$\hat{x}_{k|k} = \hat{x}_{k|k-1} + K_k v_k$$

$$P_{k|k} = (I - K_k H) P_{k|k-1}$$

The states $\Delta S_{k|k-1}$, $\delta_{R,k}$ and $\delta_{L,k}$ are correlated according to the underlying motion model f. By virtue of the correction step of the Kalman filter, the radius errors $\delta_{R,k}$ and $\delta_{L,k}$ of the wheels are thus corrected in relation to the radii $r_{R,s}$ and $r_{L,s}$, stored in particular in a data memory, of the wheels based on the residual in conjunction with the Kalman gain $K_k$ and used to calculate the new state vector $\hat{x}_{k|k}$ from the predicted state vector $\hat{x}_{k|k-1}$.

According to at least one embodiment, the radius errors $\delta_{R,k}$ and $\delta_{L,k}$ and/or the stored radii $r_{R,s}$ and $r_{L,s}$ are corrected on the basis of the ascertained residual $\hat{y}_k$ and/or the ascertained Kalman gain K and in particular then stored, in particular stored in a data memory, for use in a subsequent iteration step of the Kalman filter. As a result, it may be made possible, in particular over a plurality of correction iterations, to bring the ascertained radii $r_{R,e}$, $r_{L,e}$ close to the real radii $r_{R,a}$, $r_{L,a}$, possibly using corrected radius errors $\delta_{R,k}$ and $\delta_{L,k}$. With regard to the fact that the ascertained and stored radii relate in particular to the dynamic rolling radii, this also expediently applies accordingly to the real radii, to which reference is made here. In this way, the Kalman filter could be used to minimize an error or a difference $\delta_R$ between the current ascertained radius $r_{R,e}$ of the right rear wheel and the stored radius $r_{R,s}$ of the right rear wheel and an error or a difference $\delta_L$ between the current ascertained radius $r_{L,e}$ of the left rear wheel and the stored radius $r_{L,s}$ of the left rear wheel.

According to one development, the recorded change in the traveled distance $\Delta S$ is reset, in particular to zero, with each chronologically new GNSS measurement according to at least one embodiment after carrying out the correction step of the Kalman filter. This avoids an accumulation of errors over multiple iterations of the Kalman filter when detecting the absolute positions.

According to at least one embodiment, the ascertained traveled distance and/or position information of the vehicle determined using the ascertained traveled distance is provided for use by an at least partially automated driving control system.

According to a second aspect of the disclosure, what is described is an electronic control device for ascertaining a distance traveled by a vehicle, wherein the control device is configured to carry out a method having the following steps:

carrying out a prediction step of a Kalman filter so as to predict a predicted distance traveled by the vehicle using a change in angle of rotation of at least one right wheel and/or at least one left wheel of the vehicle for a specific period of time while the vehicle is traveling and an ascertained radius and/or ascertained circumference of the right wheel of the vehicle and/or an ascertained radius and/or ascertained circumference of the left wheel of the vehicle;

carrying out a correction step of the Kalman filter so as to correct the predicted traveled distance so as to ascertain the distance traveled by the vehicle using the predicted traveled distance and a local distance between at least two absolute positions of the vehicle that are recorded within the specific period of time with a time interval while the vehicle is traveling.

According to a further aspect of the disclosure, the electronic control device is configured to perform a method according to at least one of the described embodiments.

According to at least one embodiment, the electronic control device comprises a computing device for data processing. A computing device may be any device that is designed to process at least one of said signals. In particular, the computing device may be a processor, for example an ASIC, an FPGA, a digital signal processor, a central processing unit (CPU), a multi-purpose processor (MPP) or the like.

In one development of the specified device, the specified device has a memory. In this case, the specified method is stored in the memory in the form of a computer program, and the computing device is provided for carrying out the method when the computer program is loaded into the computing device from the memory.

According to a further aspect of the invention, a computer program comprises program code means in order to perform all the steps of one of the specified methods when the computer program is executed on a computer or one of the specified devices.

According to a further aspect of the invention, a computer program product contains a program code that is stored on a computer-readable data carrier and that, when executed on a data processing device, performs one of the specified methods.

DESCRIPTION OF THE FIGURES

Some refinements of the method and of the electronic control device are specified in the dependent claims. Further embodiments also emerge from the following description of exemplary embodiments on the basis of figures.

In each case schematically:

FIG. 1 shows one embodiment of the method 100 for ascertaining a distance traveled by a vehicle 300 according to a first aspect of the disclosure.

DETAILED DESCRIPTION OF THE FIGURES

Figure 2:
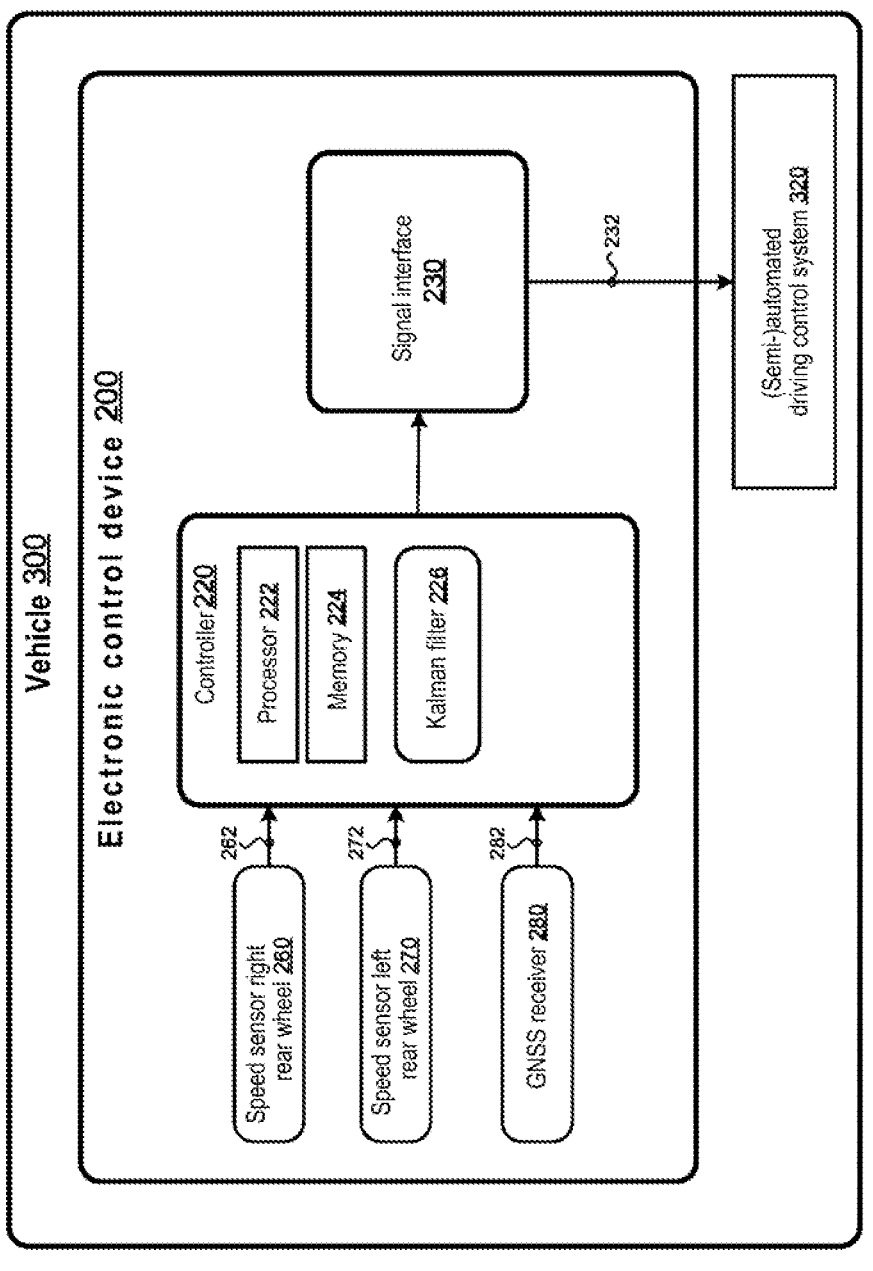
FIG. 2 shows one embodiment of the electronic control device 200 of the vehicle 300 for ascertaining a distance traveled by the vehicle 300 according to a second aspect of the disclosure.

FIG. 1 shows one embodiment of the method 100 for ascertaining a distance traveled, in particular by way of an electronic control device 200 according to FIG. 2, by a vehicle 300 according to a first aspect of the disclosure, wherein, in a step 102, a prediction step of a Kalman filter 226 is carried out so as to predict a predicted distance traveled by the vehicle 300 using a change in angle of rotation of at least one right wheel and/or at least one left wheel of the vehicle 300 for a specific period of time while the vehicle 300 is traveling and an ascertained radius of the right wheel and/or ascertained circumference of the right wheel of the vehicle 300 and/or an ascertained radius of the left wheel and/or ascertained circumference of the left wheel of the vehicle 300. In a step 104, a correction step of the Kalman filter 226 is carried out so as to correct the predicted traveled distance so as to ascertain the distance traveled by the vehicle 300 using the predicted traveled distance and a local distance between at least two absolute positions of the vehicle 300 that are recorded within the specific period of time with a time interval while the vehicle 300 is traveling.

FIG. 2 shows one embodiment of the electronic control device 200 of the vehicle 300 for ascertaining a distance traveled by the vehicle 300 according to a second aspect of the disclosure, wherein the control device 200 is configured to carry out a method 100 as described with reference to FIG. 1. To this end, the electronic control device 200 has a controller 220 for carrying out a prediction step of a Kalman filter 226, wherein the prediction step is used to predict a predicted distance traveled by the vehicle 300 using a change in angle of rotation of at least one right wheel and/or at least one left wheel of the vehicle 300 for a specific period of time while the vehicle 300 is traveling and an ascertained radius of the right wheel and/or ascertained circumference of the right wheel of the vehicle and/or an ascertained radius of the left wheel and/or ascertained circumference of the left wheel of the vehicle 300. The wheels of the vehicle 300 are not illustrated separately in FIG. 2. Changes in angle of rotation of a wheel when rolling and the speed of a wheel may be recorded using a respective wheel speed sensor 260, 270, which is assigned to a wheel and for example outputs signals 262, 272 triggered by an encoder. An output signal 262, 272 from an encoder may for example describe a square-wave signal or a sinusoidal signal. It is thus possible to detect a change in angle of a wheel by counting the number of pulses in relation to the total number of pulses during one revolution of the wheel. The accuracy of the detection of the change in angle depends here on the resolution of the encoder. According to the example, the signals 262 from the speed sensor of the right rear wheel 260 and the signals 272 from the speed sensor of the left rear wheel 270 are used by the controller for the processing performed by the Kalman filter 226.

The controller 220 is furthermore designed to carry out a correction step of the Kalman filter 226 so as to correct the predicted traveled distance so as to ascertain the distance traveled by the vehicle 300, for which purpose use is made of the predicted traveled distance and a local distance between at least two absolute positions of the vehicle that are recorded within the specific period of time with a time interval while the vehicle is traveling. Absolute positions that are ascertained in particular using the GNSS receiver 280 for receiving signals from a global navigation satellite system (GNSS) should be understood to mean in particular positions in coordinates of a global coordinate system, such as for example WGS84. In contrast thereto, odometry coordinates are often represented in a local vehicle coordinate system. The data 282 recorded by way of the GNSS receiver 280 are provided to the controller 220. To record odometry data, the electronic control device 200 may have sensors suitable for recording odometry, for example acceleration sensors and/or yaw rate sensors.

According to a further aspect of the disclosure, the electronic control device 200 is configured to perform a method according to at least one of the described embodiments of the disclosure.

According to at least one embodiment, the electronic control device 200 or the controller 220 comprises a processor 222 for data processing. In one development of the specified device 200, the specified device 200 has a data memory 224. In this case, the specified method is stored in the memory 224 in the form of a computer program, and the processor 222 is provided for carrying out the method when the computer program is loaded into the computing device from the memory. According to a further aspect of the invention, a computer program comprises program code means in order to perform all of the steps of one of the specified methods when the computer program is executed by the device 200. The Kalman filter 226 is in particular executed by way of the processor 222.

According to at least one embodiment, the controller 220 is designed to output signals 232, in particular the ascertained traveled distance and/or position information of the vehicle, by way of a signal interface 230, to a further electronic control device of the vehicle 300, for example for executing a driver assistance system or for (semi-)automated driving control 320, such as in particular automated parking assistance. According to at least one embodiment, the electronic control device 200 or the controller 220 or the method 100 may also be an integral part of a relevant (semi-)automated driving system 320, in particular in such a way that the (semi-)automated driving controls are also carried out by way of the electronic control device 200.

If it is found in the course of the proceedings that a feature or a group of features is not absolutely necessary, then the applicant aspires right now to a wording of at least one independent claim that no longer has the feature or the group of features. This may be, for example, a subcombination of a claim present on the filing date or a subcombination of a claim present on the filing date that is restricted by further features. Claims or combinations of features of this kind requiring rewording are intended to be understood as also covered by the disclosure of this application.

It should also be pointed out that refinements, features and variants of the invention which are described in the various embodiments or exemplary embodiments and/or shown in the figures may be combined with one another in any desired manner. Single or multiple features are interchangeable with one another in any desired manner. Combinations of features arising therefrom are intended to be understood as also covered by the disclosure of this application.

Back-references in dependent claims are not intended to be understood as a relinquishment of the attainment of independent substantive protection for the features of the back-referenced dependent claims. These features may also be combined with other features in any desired manner.

Features which are only disclosed in the description or features which are only disclosed in the description or in a claim in conjunction with other features may in principle be of independent significance essential to the invention. They may therefore also be individually included in claims for the purpose of delimitation from the prior art.

The invention claimed is:

1. A method for ascertaining a distance traveled by a vehicle comprising:

carrying out a prediction step of a Kalman filter so as to predict a predicted distance traveled by the vehicle using a change in angle of rotation of at least one right wheel and/or at least one left wheel of the vehicle for a specific period of time while the vehicle is traveling and an ascertained radius of the right wheel and/or ascertained circumference of the right wheel of the vehicle and/or an ascertained radius of the left wheel and/or ascertained circumference of the left wheel of the vehicle; and carrying out a correction step of the Kalman filter so as to correct the predicted traveled distance so as to ascertain the distance traveled by the vehicle using the predicted traveled distance and a local distance between at least two absolute positions of the vehicle that are recorded within the specific period of time with a time interval while the vehicle is traveling;

electronically controlling, by an electronic control device, an automated driving control system of the vehicle using the ascertained distance and/or position information of the vehicle;

wherein a state vector $\hat{x}$ for describing a state of the vehicle has the form:

$$\hat{x}=[x\ y\ \psi\ \delta_R\ \delta_L\ \Delta S]^T$$

where:

x vehicle position in odometry coordinates with respect to an X-axis of an underlying coordinate system;

y vehicle position in odometry coordinates with respect to a Y-axis of an underlying coordinate system;

$\psi$ yaw angle (yaw) of the vehicle;

$\delta_R$ radius error between an ascertained radius of a right wheel and the stored radius of the right wheel;

$\delta_L$ radius error between an ascertained radius of the left wheel and the stored radius of the left wheel; and $\Delta S$ using the traveled distance recorded by way of a global navigation satellite system.

2. The method as claimed in claim 1, wherein the ascertained radius of the right wheel and/or the ascertained circumference of the right wheel of the vehicle is ascertained based on a stored radius of the right wheel and/or stored circumference of the right wheel of the vehicle and an ascertained radius error of the right wheel and/or ascertained circumference error of the right wheel of the vehicle and/or the ascertained radius of the left wheel and/or ascertained circumference of the left wheel of the vehicle is ascertained based on a stored radius of the left wheel and/or stored circumference of the left wheel of the vehicle and an ascertained radius error of the left wheel and/or ascertained circumference error of the left wheel of the vehicle.

3. The method as claimed in claim 2, wherein the ascertained radius error of the right wheel and/or the ascertained circumference error of the right wheel of the vehicle and/or the stored radius of the right wheel and/or the stored circumference of the right wheel of the vehicle and/or the ascertained radius error of the left wheel and/or the ascertained circumference error of the left wheel of the vehicle and/or the stored radius of the left wheel and/or the stored circumference of the left wheel of the vehicle are corrected for use in a subsequent iteration of the Kalman filter based on a residual ascertained during the correction step of the Kalman filter and/or a Kalman gain.

4. The method as claimed in claim 1, wherein the prediction step is based on a non-linear motion model and/or the correction step is based on a linear measurement model.

5. The method as claimed in claim 1, wherein the prediction step is based on a non-linear motion model f and wherein the non-linear motion model f is in the form:

$$f = \begin{bmatrix} x_{(k|k-1)} \\ y_{(k|k-1)} \\ \psi_{(k|k-1)} \\ \delta_{(R,k|k-1)} \\ \delta_{(L,k|k-1)} \\ \Delta S_{(k|k-1)} \end{bmatrix} = \begin{bmatrix} x_{(k-1|k-1)} + \Delta s_k \cos\left(\psi_{(k-1|k-1)} + \frac{\Delta\psi_k}{2}\right) \\ y_{(k-1|k-1)} + \Delta s_k \sin\left(\psi_{(k-1|k-1)} + \frac{\Delta\psi_k}{2}\right) \\ \psi_{(k-1|k-1)} + \Delta\psi_k \\ \delta_{(R,k-1|k-1)} \\ \delta_{(L,k-1|k-1)} \\ \Delta S_{(k-1|k-1)} + \Delta s_k \end{bmatrix}$$

where:
$\Delta s$ traveled distance recorded using odometry;
$L_{TW}$ distance between right and left wheel;
$r_{R,a}$ real radius of the right wheel;
$r_{L,a}$ real radius of the left wheel;
$r_{R,s}$ stored radius of the right wheel;
$r_{L,s}$ stored radius of the left wheel;
$r_{R,e}$ ascertained radius of the right wheel;
$r_{L,e}$ ascertained radius of the left wheel;
$\Delta\theta_R$ change in angle of rotation of the right wheel;
$\Delta\theta_L$ change in angle of rotation of the left wheel;
$\Delta\psi$ change in yaw angle of the vehicle.

6. The method as claimed in claim 5, wherein the traveled distance ($\Delta s$) recorded using odometry and/or the change in yaw angle of the vehicle ($\Delta\psi$) of the non-linear motion model are ascertained as follows:

$$\Delta s_k = \frac{1}{2}(\Delta\theta_{R,k}(r_{R,s} + \delta_{R,k}) + \Delta\theta_{L,k}(r_{L,s} + \delta_{L,k}))$$

and/or $$\Delta\psi_k = \frac{1}{L_{TW}}(\Delta\theta_{R,k}(r_{R,s} + \delta_{R,k}) - \Delta\theta_{L,k}(r_{L,s} + \delta_{L,k})).$$

7. The method as claimed in claim 4, wherein the linear measurement model of the correction step of the Kalman filter is in the following form:

$$z_k = [\Delta S_{(k|k)}]^T,$$

wherein
$\Delta S$ describes the traveled distance ascertained by way of a global navigation satellite system.

8. The method as claimed in claim 1, wherein the traveled distance ($\Delta S$) recorded by way of a global navigation satellite system is reset with a chronologically new GNSS measurement after carrying out the correction step of the Kalman filter.

9. An electronic control device for ascertaining a distance traveled by a vehicle, wherein the control device is configured to carry out a method having the following steps:
carrying out a prediction step of a Kalman filter so as to predict a predicted distance traveled by the vehicle using a change in angle of rotation of at least one right wheel and/or at least one left wheel of the vehicle for a specific period of time while the vehicle is traveling and an ascertained radius of the right wheel and/or ascertained circumference of the right wheel of the vehicle and/or an ascertained radius of the left wheel and/or ascertained circumference of the left wheel of the vehicle;
carrying out a correction step of the Kalman filter so as to correct the predicted traveled distance so as to ascertain the distance traveled by the vehicle using the predicted traveled distance and a local distance between at least two absolute positions of the vehicle that are recorded within the specific period of time with a time interval while the vehicle is traveling; and
electronically controlling an automated driving control system of the vehicle using the ascertained traveled distance and/or position information of the vehicle;
wherein a state vector $\hat{x}$ for describing a state of the vehicle has the form:

$$\hat{x} = [x \; y \psi \; \delta_R \; \delta_L \; \Delta S]^T$$

where:
x vehicle position in odometry coordinates with respect to an X-axis of an underlying coordinate system;
y vehicle position in odometry coordinates with respect to a Y-axis of an underlying coordinate system;
$\psi$ yaw angle (yaw) of the vehicle;
$\delta_R$ radius error between an ascertained radius of a right wheel and the stored radius of the right wheel;
$\delta_L$ radius error between an ascertained radius of the left wheel and the stored radius of the left wheel; and
$\Delta S$ using the traveled distance recorded by way of a global navigation satellite system.

10. The electronic control device as claimed in claim 9, wherein the ascertained radius of the right wheel and/or the ascertained circumference of the right wheel of the vehicle is ascertained based on a stored radius of the right wheel and/or stored circumference of the right wheel of the vehicle and an ascertained radius error of the right wheel and/or ascertained circumference error of the right wheel of the vehicle and/or the ascertained radius of the left wheel and/or ascertained circumference of the left wheel of the vehicle is ascertained based on a stored radius of the left wheel and/or stored circumference of the left wheel of the vehicle and an ascertained radius error of the left wheel and/or ascertained circumference error of the left wheel of the vehicle.

11. The electronic control device as claimed in claim 10, wherein the ascertained radius error of the right wheel and/or the ascertained circumference error of the right wheel of the vehicle and/or the stored radius of the right wheel and/or the stored circumference of the right wheel of the vehicle and/or the ascertained radius error of the left wheel and/or the ascertained circumference error of the left wheel of the vehicle and/or the stored radius of the left wheel and/or the stored circumference of the left wheel of the vehicle are corrected for use in a subsequent iteration of the Kalman filter based on a residual ascertained during the correction step of the Kalman filter and/or a Kalman gain.

12. The electronic control device as claimed in claim 9, wherein the prediction step is based on a non-linear motion model f and/or the correction step is based on a linear measurement model.

13. The electronic control device as claimed in claim 12, wherein the non-linear motion model f is in the form:

$$
f = \begin{bmatrix} x_{(k|k-1)} \\ y_{(k|k-1)} \\ \psi_{(k|k-1)} \\ \delta_{(R,k|k-1)} \\ \delta_{(L,k|k-1)} \\ \Delta S_{(k|k-1)} \end{bmatrix} = \begin{bmatrix} x_{(k-1|k-1)} + \Delta s_k \cos\left(\psi_{(k-1|k-1)} + \dfrac{\Delta\psi_k}{2}\right) \\ y_{(k-1|k-1)} + \Delta s_k \sin\left(\psi_{(k-1|k-1)} + \dfrac{\Delta\psi_k}{2}\right) \\ \psi_{(k-1|k-1)} + \Delta\psi_k \\ \delta_{(R,k-1|k-1)} \\ \delta_{(L,k-1|k-1)} \\ \Delta S_{(k-1|k-1)} + \Delta s_k \end{bmatrix}
$$

where:
$\Delta s$ traveled distance recorded using odometry;
$L_{TW}$ distance between right and left wheel;
$r_{R,a}$ real radius of the right wheel;
$r_{L,a}$ real radius of the left wheel;
$r_{R,s}$ stored radius of the right wheel;

$r_{L,s}$ stored radius of the left wheel;
$r_{R,e}$ ascertained radius of the right wheel;
$r_{L,e}$ ascertained radius of the left wheel;
$\Delta\theta_R$ change in angle of rotation of the right wheel;
$\Delta\theta_L$ change in angle of rotation of the left wheel;
$\Delta\psi$ change in yaw angle of the vehicle.

14. The electronic control device as claimed in claim 13, wherein the traveled distance ($\Delta s$) recorded using odometry and/or the change in yaw angle of the vehicle ($\Delta\psi$) of the non-linear motion model are ascertained as follows:

$$
\Delta s_k = \frac{1}{2}(\Delta\theta_{R,k}(r_{R,s} + \delta_{R,k}) + \Delta\theta_{L,k}(r_{L,s} + \delta_{L,k}))
$$

and/or $$
\Delta\psi_k = \frac{1}{L_{TW}}(\Delta\theta_{R,k}(r_{R,s} + \delta_{R,k}) - \Delta\theta_{L,k}(r_{L,s} + \delta_{L,k})).
$$

15. The electronic control device as claimed in claim 12, wherein the linear measurement model of the correction step of the Kalman filter is in the following form:

$$
z_k = [\Delta S_{(k|k)}]^T,
$$

wherein
$\Delta S$ describes the traveled distance ascertained by way of a global navigation satellite system.

16. The electronic control device as claimed in claim 9, wherein the traveled distance ($\Delta S$) recorded by way of a global navigation satellite system is reset with a chronologically new GNSS measurement after carrying out the correction step of the Kalman filter.

\* \* \* \* \*